(No Model.) 2 Sheets—Sheet 1.
A. RENGERT.
APPARATUS FOR MANUFACTURING CANDLES.
No. 262,831. Patented Aug. 15, 1882.
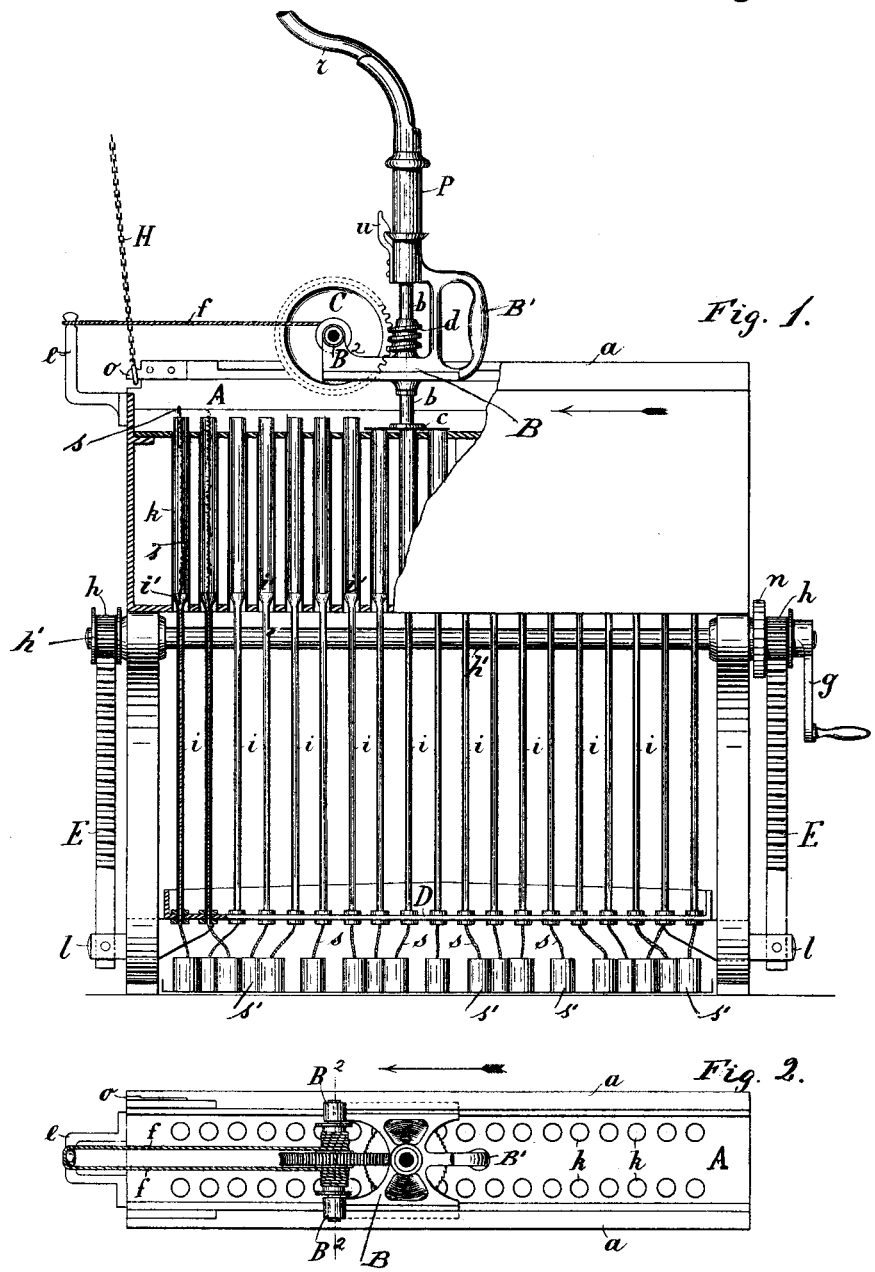

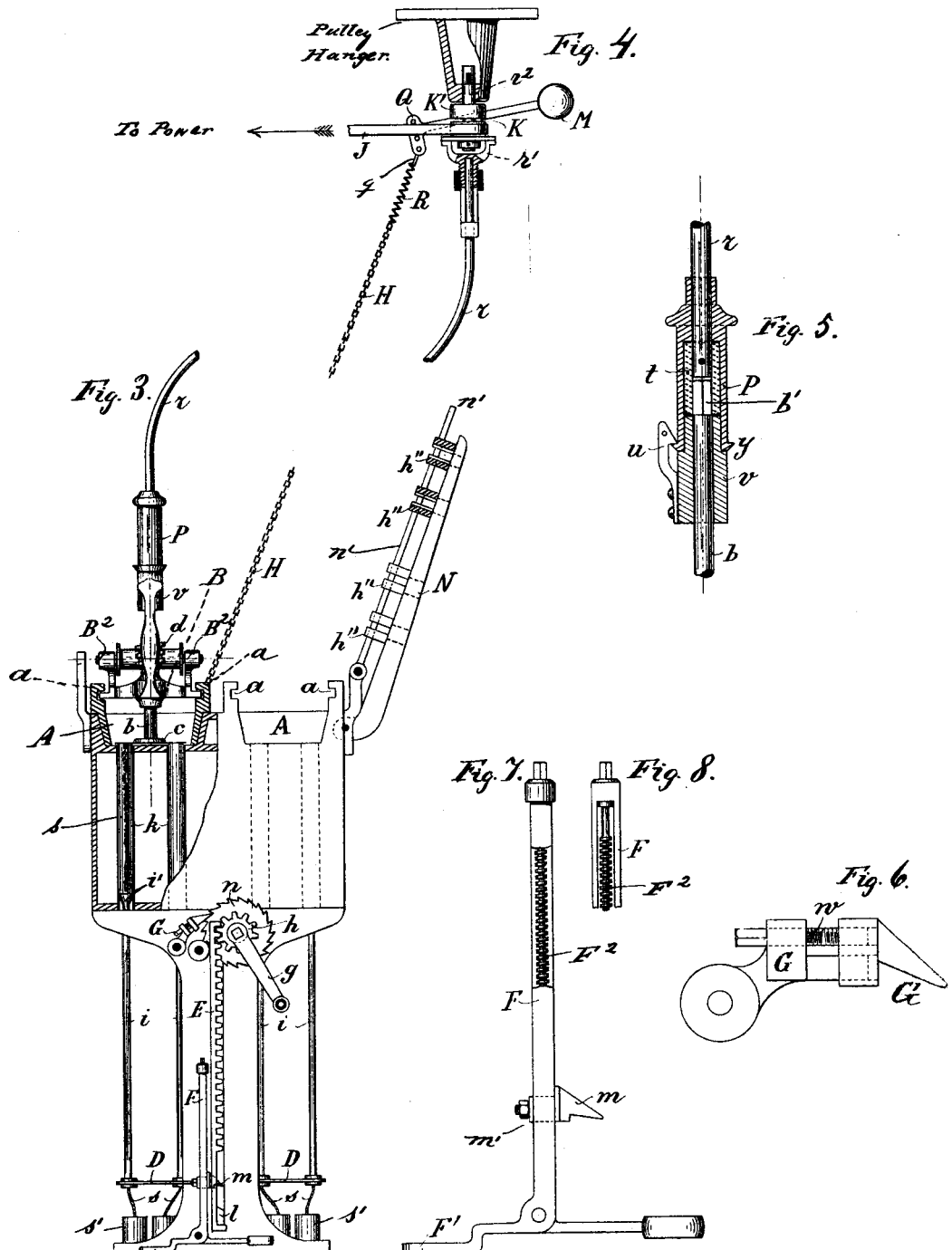

UNITED STATES PATENT OFFICE.

ADOLPH RENGERT, OF BERLIN, GERMANY, ASSIGNOR TO LOUIS CLAUDE ADOLPHE MOTARD AND CHARLES EUGENE MOTARD, OF SAME PLACE.

APPARATUS FOR MANUFACTURING CANDLES.

SPECIFICATION forming part of Letters Patent No. 262,831, dated August 15, 1882.

Application filed April 24, 1882. (No model.)

To all whom it may concern:

Be it known that I, ADOLPH RENGERT, a subject of the Emperor of Germany, and a resident of the city of Berlin, in Prussia, in the German Empire, have invented certain new and useful Improvements in Apparatus for Manufacturing Candles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my apparatus or machine for manufacturing candles, shown partially in section. Fig. 2 is a plan or top view of the same. Fig. 3 is an end view, shown partially in section. Fig. 4 is a detail view of the pulley-hanger, pulley, and automatic belt-shifting device for operating a set or "plant" of the machines. Fig. 5 is a sectional detail view of the coupling for connecting the flexible shaft or motion-transmitter $r$ and the arbor $b$ of the rotary cutter $c$. Fig. 6 is a detail view of the pivoted pawl G, which operates in conjunction with the ratchet-wheel $n$. Fig. 7 is a detail view of the device for adjusting or regulating the stroke of the rack-bars E. Fig. 8 is a detail view of the upper end of said device, looking at it at right angles to the view shown in Fig. 7. Fig. 9 is a plan of two sets or plants of machines arranged on both sides of the operating-pulleys, and Fig. 10 is a plan of a set or plant of machines arranged in a circle around the centrally-placed operating-pulley T.

Similar letters of reference indicate corresponding parts in all the figures.

My invention has relation to molds or machines for manufacturing candles of stearine, wax, spermaceti, paraffine, and other suitable materials and compositions; and it consists in the improvements hereinafter more fully described, and particularly pointed out in the claims.

The candle-molds (shown at $k$) are arranged in two or more parallel rows within a suitably-constructed frame below the trough or troughs A, into the bottom of which they are inserted. I use one of these troughs for each two rows of molds, and each trough is made with parallel grooves or ways $a$ $a$, in which slides a frame or carriage, B, having a handle, B', and vertical arbor $b$, upon which is an endless screw or worm, $d$. At the lower end of the arbor, and flush with the bottom of the trough, is a fine-toothed circular saw or cutter, $c$. The worm $d$ meshes with a cog-wheel, C, mounted upon an axle, B², in one end of carriage B, around which is wound a cord, $f$, which is passed around a standard, $e$, at one end of the machine. It follows that, starting frame or carriage B from one end of the ways $a$, the rotation of the arbor $b$, with its worm or endless screw $d$, will rotate the cog-wheel C, the axle B² of which will wind up the cord or rope $f$, and thus draw carriage B, with its appurtenances, in the direction of the arrow from one end of the machine to the other.

Rotary motion is imparted to the arbor $b$ by the mechanism shown in detail in Figs. 4 and 5 in the drawings, from which (see Fig. 5) it will be seen that the arbor $b$ terminates at its upper end in a square head, $b'$, which fits into a square socket, $t$, in the coupling-box P, in which is fastened the lower end of the flexible shafting $r$, so that the box P will rotate with it. Similarly the upper end of arbor $b$ is fastened in a box, $v$, which revolves with it and has a spring hook or catch, $u$, attached to one side, the lip of which projects over a flange, $y$, at the lower end of coupling-box P, thus connecting P and $v$ and preventing them from coming apart. At the same time it will be seen that the arbor $b$ may be uncoupled instantaneously from shaft $r$ by slipping the catch $u$ off of the rim or flange $y$ when the boxes P and $v$ may be drawn apart or detached from each other. The flexible shafting $r$ is fastened at its upper end in a coupling, $r'$, which connects it with the vertical pulley-shaft $r^2$, (see Fig. 4,) upon which are a fixed pulley, K, and loose pulley K'.

Q is a lever, at one end of which is a link, $q$, for the attachment of a hooked spring, R, while the opposite end has a weight, M.

The fixed pulley K is rotated by an endless belt, J, from any suitable power machine.

To the lower end of the hooked spring R is fastened a chain, H, the lower end of which has a link or loop that may be slipped over a projection, $o$, at one end of trough A. When chain H is so attached it will, by the tension of spring R, hold the lever or belt-shifter Q M in the position shown in Fig. 4; but when carriage B, drawn by cord *f*, has reached the end of its travel it will strike the lower end of the chain and push it off of the projection *o*, which releases the lever and permits its weighted end M to drop, thus shifting belt J from the fixed pulley K up upon the loose pulley K', and thereby stopping rotation of the flexible shaft *r* and arbor *b* at the exact moment when the frame or carriage B has reached the end of its travel.

By reference to the diagrams shown in Figs. 9 and 10 of the drawings, in which the letter T represents the pulley-hangers and pulleys with their appurtenances, as shown in Fig. 4, and W represents the machines, it will be seen that one pulley mechanism is sufficient to operate four or more of the machines, the carriage B being carried successively from one machine to another as it is called into service, in the manner and for the purpose hereinafter set forth. The spring R, which connects the chain with the belt-shifter, by stretching will compensate for any slight difference in the distance between the motor T and the machines arranged below and around it.

The candle molds or formers *k* have inserted into their lower open ends tubular plungers *i*, terminating at their upper ends in flaring mouths or funnel-shaped cups *i'*, of the exact shape which the tip or point of the finished candle is to have. The tubular plungers *i* are all mounted in their proper position relative to the candle-molds in a plate, D, to the ends of which are fastened vertical racks or rack-bars E, meshing with gear-wheels *h h*, keyed upon opposite ends of a common shaft, *h'*, and turned by a crank, *g*, at one end of the shaft. After the racks have been raised the required distance (raising with them plate D, with its series of plungers *i*) they are prevented from dropping back by a ratchet-wheel, *n*, fixed upon one end of shaft *h'*, with which a pivoted pawl, G, engages. (See Figs. 3 and 6.) The lip G' of this pawl is adjustable in its frame or bearing G by means of a screw, *w*, so that the point of the lip may always be so adjusted as to compensate for wear by friction against the teeth of the ratchet-wheel, so that there shall be no "back action" or reverse movement of the latter at the moment when the pawl falls into its proper notch.

*s' s'* are the wick-boxes, into which the wicks *s* are coiled in such a manner as to be readily uncoiled. The wicks are inserted through the tubular plungers *i i'* and continued up through the molds *k*, their upper ends being fastened in a clamping device, to be hereinafter described.

At one end of the machine is a slotted standard, F, (see Figs. 3, 7, and 8,) within which is a screw, F². This screw works through the nut or screw-threaded socket *m'* of the nose-piece *m*, which projects out from the slotted standard, within which it may be adjusted vertically—that is, raised or lowered—by turning the screw F² to one side or the other. At the lower end of standard F is a counterpoised treadle, F', by means of which the standard, with its nose *m*, may be turned or swung to one side, so as to be out of the way of the projecting shoulder or offset *l* at the lower end of the appropriate rack-bar E.

To one side of the frame, in which the troughs A A, with their molds *k*, are placed, is hinged a plate, N, to the under side of which are secured a series of clamps, *h''*, arranged in pairs and so placed that a pair of these clamps will be exactly over each of the molds *k*. A bar, *n'*, is also hinged to the same side of the frame for each transverse row of molds *k*, and when these bars are swung down upon and across the troughs A A the upper ends of the wicks *s* may be fastened to it. The top plate, N, is perforated between each pair of clamps *h'' h''*, as indicated by dotted lines, for the purpose pointed out in describing the operation of the machine, which is follows:

The stearine or other material of which the candles are to be made is poured in a melted state into the troughs A, from it which it flows down into the molds *k k*. When it has cooled off and become sufficiently hard the crank *g* is turned, which raises the rack-bars E E and with them the plate D and plungers *i*. Meanwhile the projecting nose or stop *m* has been adjusted in its standard F at such an elevation that it will stop the racks E (by the step *l* striking against it) when a sufficient length or portion of the molded candle has been pushed out of the molds and up into the body of the troughs, as shown in Fig. 1. At this point the chain H is hitched upon the projection *o*, and the carriage B is started in its ways *a a* from one end of the machine, and as it is drawn from one end of the trough to the other the circular saw *c* cuts off the projecting ends of the candles, thus causing the whole batch to be of exactly even length and weight. The stop *m* is now turned to one side, so as to be out of the way, and the rack-bars E E are wound up all the way by turning crank *g*, the perforated cover N, with its clamps, having first been closed down over the troughs after the removal of the cutter-carriage B. In this manner the candles are pushed by the plungers *i i'* out of the molds and up between their respective clamps *h'' h''* through the perforated cover or plate N, drawing the wicks after them centrally through the empty molds in position for the next batch of candles to be molded. The finished candles are removed by cutting the wicks a suitable distance below their tips or points, but not until the next batch of candles has been molded, as the finished batch, which are held in the clamps *h'' h''*, serve to hold the wicks in position for the batch about to be molded.

Having thus described my invention, I claim and desire to secure by Letters Patent of the United States of America—

1. In a machine or apparatus for manufacturing candles, the combination of the molding-trough A, having the molds or formers $k$ and parallel ways $a\ a$, and carriage B, sliding in said ways and provided with the arbor $b$, circular cutter $c$, and mechanism for rotating said cutter, substantially as set forth.

2. The combination of the trough A, having molds $k$, ways $a\ a$, and standard $e$, carriage B, having the rotary arbor $b$, provided with the cutter $c$ and worm $d$, cog-wheel C, keyed upon the shaft $B^2$ of carriage B, and gearing with its worm $d$, cord $f$, doubled around the standard $e$, and wound around shaft $B^2$, and mechanism for rotating the arbor $b$, substantially as set forth.

3. The combination of the trough A, having molds or formers $k$, ways $a\ a$, and projection $o$, sliding cutter-carriage B, chain H, having hooked spring R at its upper end, pivoted belt-shifter Q, having link $q$ and weight M, shaft $r^2$, having fixed pulley K and loose pulley K′, coupling $r'$, and flexible shafting $r$, adapted to impart rotary motion to the arbor of the cutter-carriage, all constructed and combined to operate substantially as and for the purpose herein shown and set forth.

In testimony that I claim the foregoing as my own I have hereunto affixed my signature in presence of two witnesses.

ADOLPH RENGERT.

Witnesses:
BERTHOLD ROI,
HERMANN RASSBACH.